June 9, 1959 N. M. SULLIVAN 2,889,907
ANTIFRICTION-TYPE CONVEYOR RAIL FOR ARTICLE STORAGE RACKS
Filed Feb. 18, 1957 2 Sheets-Sheet 1

INVENTOR
*Norman M. Sullivan*

BY *W. S. Rambo*
ATTORNEY

United States Patent Office 2,889,907
Patented June 9, 1959

2,889,907

ANTIFRICTION-TYPE CONVEYOR RAIL FOR ARTICLE STORAGE RACKS

Norman M. Sullivan, Cincinnati, Ohio, assignor to The Alvey-Ferguson Company, Cincinnati, Ohio, a corporation of Ohio Application February 18, 1957, Serial No. 640,769

8 Claims. (Cl. 193—35)

This invention relates to conveyor rails for storage racks. It has to do, more particularly, with conveyor rails that are embodied in that type of storage rack which includes decks composed of conveyor rails that carry rollers upon which the stored articles are supported for movement automatically by a gravity force from the loading side to the take-out side of the rack.

The conveyor rails used in a rack of this type generally include supporting rail sections which carry antifriction rollers that actually support the articles. These rails are arranged in rows with each article usually supported by a plurality of the rails and the rails are slightly inclined to feed the articles by gravity towards the take-out side of the rack, as articles are loaded at the loading side or are removed at the take-out side of the rack. The rows of conveyor rails are usually arranged in the storage rack in a plurality of decks. It is important in a rack of this nature to maintain the rows of articles of each deck in spaced relationship so that they will not interfere with each other. For this purpose, it is customary to provide divider rails or guides between adjacent rows of articles.

One of the main objects of this invention is to provide a divider conveyor rail for use in a rack of the type indicated which is of novel construction in itself and which is associated with other rails in the rack in a novel manner so that the complete rack structure will keep horizontally adjacent rows of the supported articles in spaced relationship with the result that rows of horizontally adjacent articles will not contact each other and will be separated from one another by antifriction guide means.

Another object of this invention is to provide a divider rail arrangement of the type indicated in which the spacing of the rows of articles is accomplished with a minimum amount of friction on the articles which would tend to interfere with or impede the automatic gravity feed of the articles along the rails.

In the accompanying drawings, the divider conveyer rail structure of this invention is illustrated in association with other conveyer rails in the deck of a rack according to this invention. However, it is to be understood that these drawings are illustrative only and that specific details of the structures can vary without departing from the basic principles of this invention.

Figure 1:
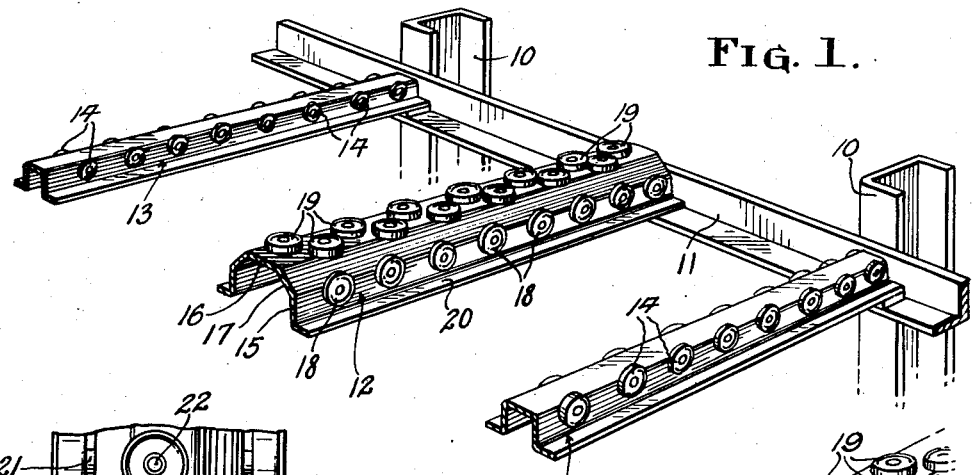
Figure 1 is a perspective view illustrating a conveyer rail deck arrangement in accordance with this invention.
Figure 5:
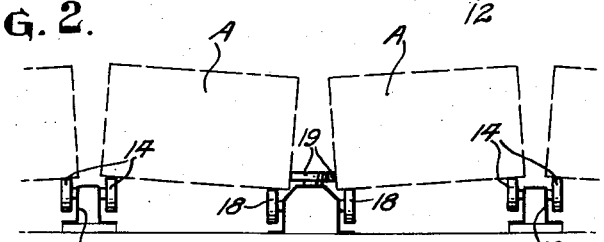
Figure 5 is a schematic view illustrating the function of the divider conveyer rail and associated conveyer rails.

With reference to the drawings, in Fig. 1 there is shown a portion of a deck of a storage rack embodying this invention. The rack usually includes suitable vertical supports or posts 10 and transversely extending horizontal supporting members 11 of a suitable type carried thereby. The conveyor rails extend at right angles to the supports 11 and in parallel relationship with each other in the example shown in Fig. 1. These conveyor rails include the divider article-supporting conveyer rails 12 and article-supporting conveyor rails 13 of the type shown in my prior Patent No. 2,740,513, one or more of these rails 13 being disposed at each side of the divider rail 12 and in slightly vertically elevated relation thereto, as indicated in Fig. 5.

The rails 13 are constructed in the usual manner embodying an inverted channel structure which carries the antifriction rollers 14 disposed on opposite sides thereof and mounted for rotation on transverse axles. The upper surfaces of the rollers 14 are above the top surface of the inverted channel, as shown, to support thereon an edge portion of the articles to be stored.

Figure 2:
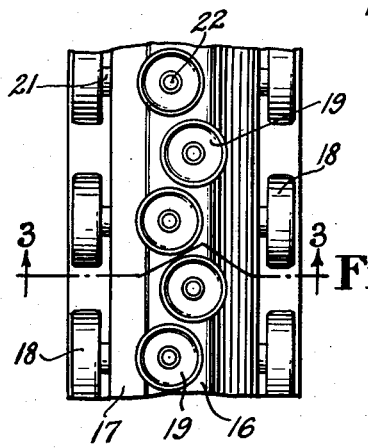
Figure 2 is a plan view of a portion of a divider conveyer rail according to this invention.
Figure 3:
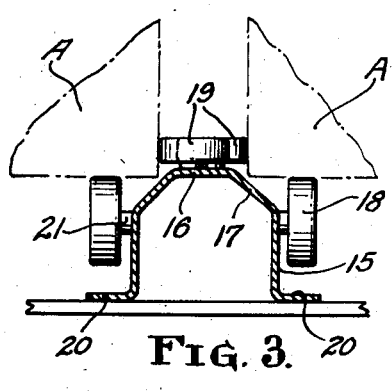
Figure 3 is a transverse sectional view taken along line 3—3 of Figure 2 through the divider rail and showing diagrammatically how its supports the articles.
Figure 4:
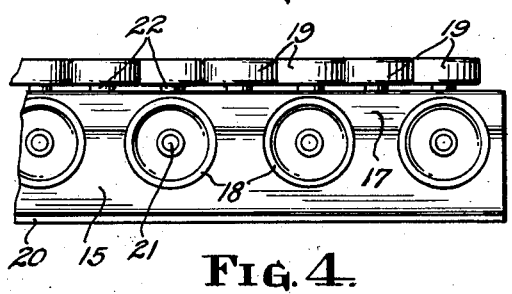
Figure 4 is a side elevational view of the divider rail shown in Figures 2 and 3.

The divider rails 12 are of novel construction. Each of these rails 12 is formed of an inverted channel structure which in cross-section is wider than that of the rails 13. This channel section includes the vertically disposed side walls 15, the flat top wall 16, the joining inclined walls 17 and lateral base flanges 20. At each side of the rail 12, supported by transverse axles 21 on the walls 15, are the article-supporting rollers 18. These rollers 18 extend upwardly (Fig. 3) beyond the upper extremity of the side wall 15 but below the level of the top wall 16. These rollers 18 are disposed at suitably spaced longitudinal intervals along the rail 12. The flat top wall 16 carries on its upper surface a plurality of antifriction guide rollers 19. These rollers are mounted for rotation about vertical axles 22 carried by the top wall 16 and are arranged in two laterally spaced rows as shown in Figure 2, each row consisting of longitudinally spaced rollers which are in alignment with each other. The adjacent rollers of the two rows are staggered as indicated in Figure 2. Obviously, the rollers 19 are at a substantially higher level than the upper supporting surfaces of the rollers 18. Thus, the two rows of guide rollers 19 are provided and each row is laterally offset relative to the other row so that each row is adjacent one of the inclined walls 17. The rollers 19 of each row project outwardly (Figure 3) beyond the outer extremity of the top wall 16 and over the associated inclined wall 17 but are within the associated side wall 15. The rollers 18 and 19 are so related to each other that the corner of an article A (Figure 3) supported by the rollers 18 will be prevented from contacting the inclined wall surface 17 by the rollers 19 of the associated row.

As previously indicated, in incorporating the rails 12 and 13 in a deck of a storage rack, they are disposed in properly spaced parallel relationship, with one or more of the rails 13 being disposed on each side of a divider rail 12. As shown in Figures 1 and 5, each of the rails 13 is disposed at a slightly higher level than the adjacent rails 12, assuming that the rails 12 and 13 are formed of channels of the same depth. This is for the purpose of locating the supporting rollers 14 of the rails 13 at a slightly higher level than the supporting rollers 18 of the rails 12. However, the same results can be obtained by having the rails 13 of greater depth with all the rails 12 and 13 supported at the same level. The important factor is to have the rollers 14 slightly higher than the rollers 18. This causes an article A supported by the adjacent rails 12 and 13 to tilt laterally towards the rail 12 so that the article A will always contact the guide rollers 19 at that side of the rail 12. However, this tilting is not sufficient to cause interference with articles of an adjacent row as illustrated in Figure 5.

With this arrangement, it will be apparent that each row of articles A will be supported by a divider rail 12 and one or more adjacent rails 13. The articles A in each row will be tilted towards the divider rail 12 so that they will contact with the guide rollers 19 in the row at that side of the rail 12. Thus, adjacent rows of articles A will be properly spaced from each other so that articles of adjacent rows will not interfere with each other, the articles of each row will be maintained in alignment and, consequently, the articles of each row will feed from the loading side of the rack to the take-out side thereof without any difficulty. Furthermore, although the divider rails align the articles of each row and keep the articles of adjacent rows from interfering with each other, this is accomplished with a minimum amount of friction on the articles which would tend to interfere with their automatic gravity feed along the rails.

Figure 6:
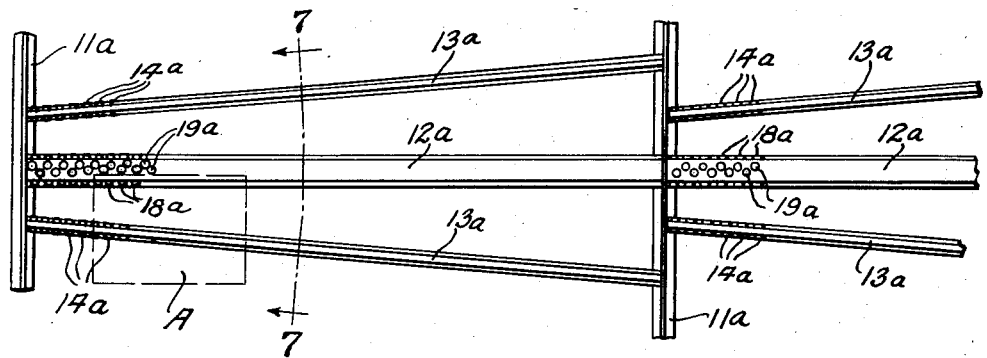
Figure 6 is a diagrammatic plan view showing a different arrangement of the divider rails and associated conveyer rails in a deck.
Figure 7:
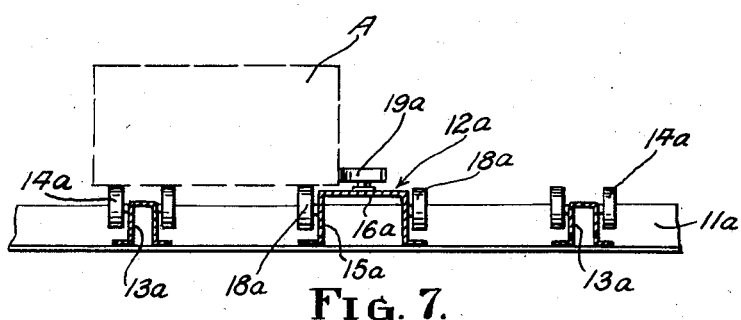
Figure 7 is a transverse sectional view taken along line 7—7 of Figure 6.

In Figures 6 and 7, a different arrangement is illustrated in a storage rack deck. In this instance, the article-supporting conveyor rails 13a are exactly the same as the rails 13 previously described and carry the supporting rollers 14a. The intermediate divider rail 12a is somewhat different from the rail 12 previously described. Furthermore, all of the rails 12a and 13a are disposed in the same substantially horizontal plane with the rollers 14a of the rails 13a and the rollers 18a of the rails 12a disposed at the same level. Moreover, the rails 12a and 13a are not disposed in parallel relationship but the two adjacent rails 13a converge towards the rail 12a in the direction of movement of the articles, as shown in Figure 6, it being understood that all the rails are inclined slightly in that direction to obtain the gravity feed.

It will be noted best from Figure 7 that the rail 12a is of inverted straight channel form and includes the vertical side walls 15a and the flat top wall 16a. The guide rollers 19a are supported in two laterally offset rows in the same manner as with the rollers 19 previously described except they need not project beyond the extremities of the top wall 16a. However, the rollers 18a will extend up above the top wall 16a. As shown in Figure 7, an article A supported by the rollers 18a will also be in engagement with the row of guide rollers 19a at that side of the rail 12a. The converging of each rail 13a towards the rail 12a, functions to keep the row of articles supported by those two rails in contact with the associated guide rollers 19a. This action is apparent from the force diagram of Figure 8.

Figure 8:
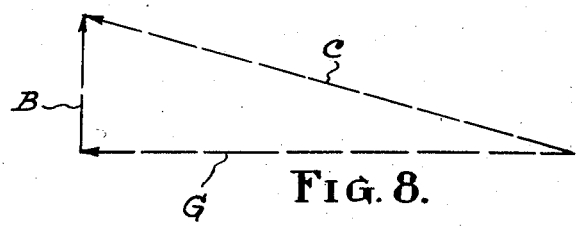
Figure 8 is a force diagram illustrating the action of the conveyer rail arrangement shown in Figures 6 and 7.

With specific reference to the diagram of Figure 8, it will be apparent that the gravity force created by the inclination of the rails acts in the direction of the arrow G. The converging rail 13a indicated by the arrow C acts laterally on the articles as they tend to move along due to the gravity force, there being a certain amount of slippage between rollers 14a and the articles. The resultant of these forces is indicated by the arrow B which is a lateral force that tends to move the articles A laterally over against the rollers 19a at the cooperating side of the rail 12a.

Thus, it will be apparent that according to this invention a divider or guide rail is provided which includes both article-supporting rollers and guide rollers. Furthermore, the divider or guide rail is incorporated in the rack in such a manner that means is provided in association therewith for maintaining articles supported thereby in contact with the guide rollers thereof at all times.

It will be apparent that with the deck arrangement for a storage rack which is provided according to this invention, the articles are supported in adjacent rows and the articles of adjacent rows are prevented from interfering with each other. The articles of each row are maintained in proper alignment with each other. This alignment of the articles of each row and the spacing of the rows is accomplished with a structure which produces a minimum amount of friction on the articles that would tend to interfere with the gravity feed thereof from the loading side of the rack to the take-out side of the rack.

Various other advantages will be apparent.

I claim:

1. A storage rack including a plurality of elongated, transversely spaced article-supporting conveyor rails, said rails comprising a divider conveyor rail having an associated conveyor rail at each side thereof, the divider rail and the associated conveyor rail on each side thereof cooperating to support two rows of articles, all of said rails carrying support rollers mounted on transverse axes for supporting the articles and being inclined to feed the articles by gravity therealong, said divider rail including two rows of laterally offset guide rollers mounted on vertical axes arranged to engage and separate the sides of articles disposed in pairs on opposite sides of said divider rail.

2. A structure according to claim 1, in which said divider rail has a flat top wall, two vertically disposed side walls and connecting inclined walls, the guide rollers of said divider rail projecting over the associated inclined wall, the supporting rollers of said divider rail being carried by the side walls thereof and projecting upwardly beyond the lower extremities of the adjacent inclined walls.

3. A structure according to claim 1, in which said vertically disposed supporting rollers of all the rails are at the same level, said associated conveyor rails converging towards the divider rail in the direction of inclination of said rails.

4. A conveyor guide rail comprising an elongated body formed with a pair of opposed, transversely spaced, vertically arranged side walls and a coextensive top wall; a plurality of longitudinally spaced, article-supporting rollers projecting laterally outwardly from each of said side walls; and a plurality of longitudinally spaced, article-guiding rollers mounted on vertical axes projecting from said top wall, said article-guiding rollers being arranged in two laterally offset rows extending substantially coextensively of the length of said body.

5. In a conveyor-type article storage rack, a plurality of relatively elongated, transversely spaced, downwardly inclined article-supporting rails having roller devices thereon for the antifriction support of articles to be stored; and an intermediate article-guiding rail positioned between said supporting rails and defining with the latter a plurality of separate article-conveying rows, said guiding rail having on each side thereof a multiplicity of longitudinally spaced article-supporting rollers arranged to engage the undersides of articles to be stored and having on the upper surface thereof a plurality of longitudinally spaced, transversely staggered antifriction rollers arranged to engage the sides of articles to be stored and to maintain articles disposed in said separate article-conveying rows against contact with one another.

6. A storage rack including a set of article-supporting conveyor rails, each set of rails comprising a guide conveyor rail and an associated conveyor rail which cooperate to support a row of articles to be stored, said rails both carrying vertically disposed rollers at the same level mounted on transverse axes for supporting the articles and the rails being inclined longitudinally relative to the horizontal to feed the articles by gravity therealong, said associated conveyor rail converging toward the guide rail in the direction of inclination of said rails, said guide rail having a flat top wall and vertical side walls, said guide rail including horizontally disposed guide rollers mounted on vertical axes on said top wall and being disposed within said vertically disposed side walls, and said vertically disposed rollers of the guide rail being disposed below the flat top wall thereof.

7. A conveyor structure comprising a guide rail embodying a pair of opposed, transversely spaced, vertically arranged longitudinally extending side walls and a longitudinally extending top wall; a plurality of longitudinally spaced, article-supporting rollers extending laterally outwardly from each of said side walls; and a plurality of longitudinally spaced article-guiding rollers mounted on vertical axes above said top wall, said article-guiding rollers being arranged in two laterally offset rows extending longitudinally of said top wall.

8. A storage rack including a plurality of elongated, transversely spaced article-supporting conveyor rails, said rails comprising a divider conveyor rail having an associated rail at each side thereof, the divider rail and the associated rail on each side thereof supporting rollers mounted on laterally extending axes for supporting the articles and being inclined longitudinally to feed the articles by gravity therealong, said divider rail including two rows of laterally offset guide rollers mounted on vertical axes arranged to engage and separate the sides of articles disposed in pairs on opposite sides of said divider rail.

References Cited in the file of this patent
UNITED STATES PATENTS

| | | |
|---|---|---|
| 872,856 | Spence | Dec. 3, 1907 |
| 935,669 | Logan | Oct. 5, 1909 |
| 1,692,970 | Warnick | Nov. 27, 1928 |
| 1,946,458 | Evans | Feb. 6, 1934 |
| 2,786,578 | DeGraaf | Mar. 26, 1957 |

OTHER REFERENCES

"Live Rail," The Alvey-Ferguson Co., Cincinnati 9, Ohio (copyright 1953).